March 3, 1970 H. GERNER 3,498,152
ADJUSTABLE SPINDLE NUT FOR MACHINE TOOL CARRIAGES
Filed July 5, 1968 3 Sheets-Sheet 1
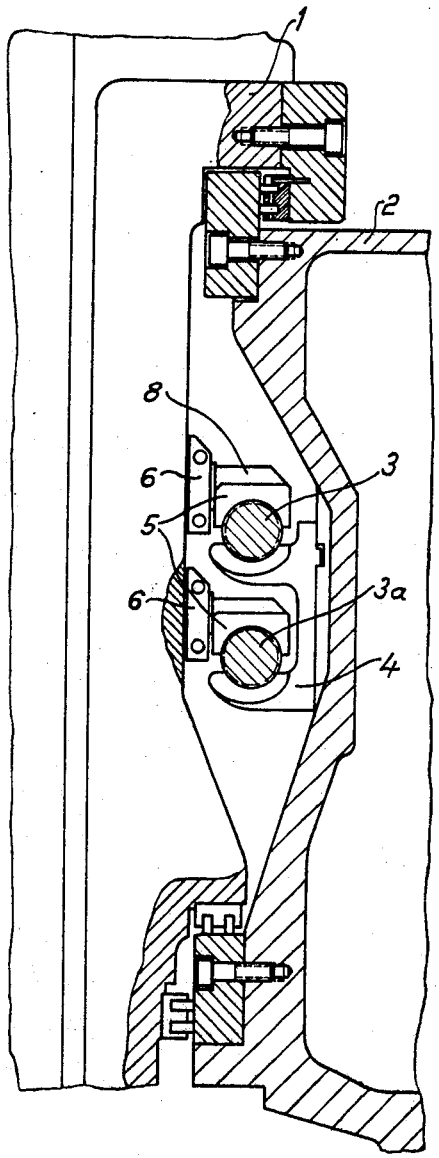
INVENTOR.
HEINZ GERNER
BY
Wordhams, Blanchard & Flynn
ATTORNEYS March 3, 1970   H. GERNER   3,498,152
ADJUSTABLE SPINDLE NUT FOR MACHINE TOOL CARRIAGES
Filed July 5, 1968   3 Sheets-Sheet 2
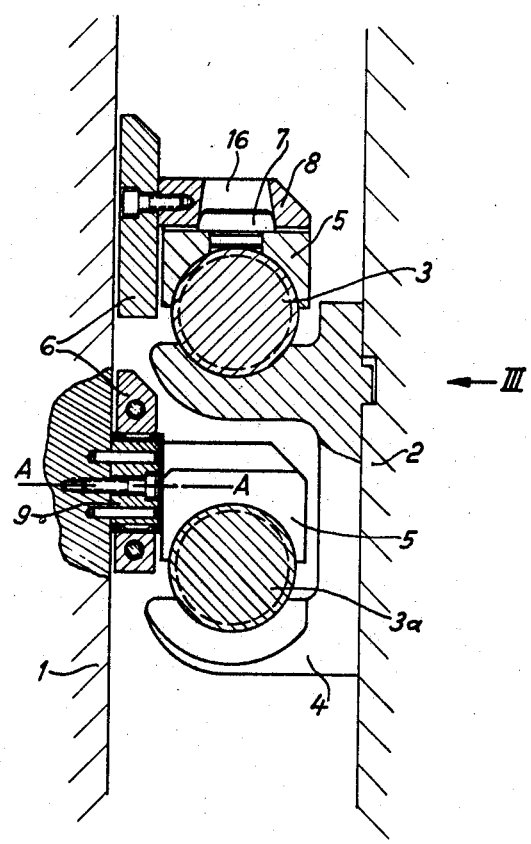
INVENTOR.
HEINZ GERNER

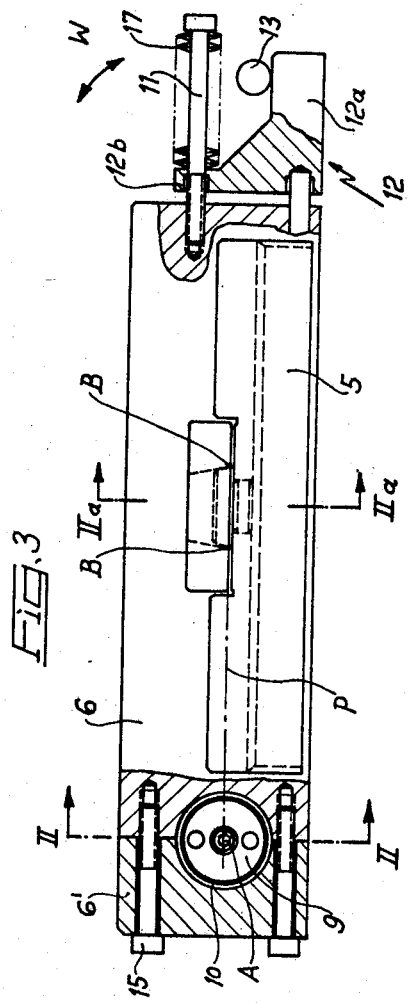

United States Patent Office 3,498,152
Patented Mar. 3, 1970

3,498,152
ADJUSTABLE SPINDLE NUT FOR MACHINE
TOOL CARRIAGES
Heinz Gerner, Eichendorffweg 9, Coburg, Germany
Filed July 5, 1968, Ser. No. 742,611
Claims priority, application Germany, July 6, 1967,
W 40,104
Int. Cl. F16h 55/18
U.S. Cl. 74—409                                5 Claims

ABSTRACT OF THE DISCLOSURE

A machine tool carriage is advanced by a spindle engaging a half-nut and the half-nut is rendered free of backlash by mounting it floatingly on a rocker rotatable about an axis perpendicular to the spindle and biased towards the spindle by a spring acting through a bell-crank lever.

The invention relates to a backlash-free adjustable spindle nut for machine-tool carriages and slides, using a half-nut half-embracing the spindle.

It is the purpose of the present invention to provide a backlash-free adjustable spindle nut, which permits backlash-free connection to the spindle, and which is adjusted automatically corresponding to the particular geometrical position of the spindle thread and the particular degree of wear.

This is achieved according to the invention in that the half-nut is floatingly mounted on a rocker pivoted about an axis arranged perpendicularly to the spindle, and a spring is provided, which loads the rocker in a direction towards the spindle and hence presses the half-nut against the spindle. Owing to this floating suspension of the spindle nut and the spring loading of the rocker, the spindle nut is pressed continuously against the screwthread of the spindle. Any backlash or play is thereby eliminated automatically and independently of the particular degree of wear and the particular geometrical position.

Further advantages and details of the invention are explained more particularly in the following with reference to an embodiment example represented in the drawing, in which:

FIG. 1 shows a cross-section through the cross-rail and carriage of a machine tool, FIG. 2 shows at the top a cross-section on the line II—II in FIG. 3 through the spindle nut, FIG. 2 at the bottom a cross-section on the line IIa—IIa in FIG. 3, FIG 3 shows a view of the spindle nut in the direction III in FIG. 2, the spindles being omitted.

In the drawing, 1 denotes the carriage of a machine tool, which carriage is slidably guided on the cross-rail 2 of the said machine tool. The spindle 3, supported on supporting bearings 4 of the cross-rail, provides the drive. A second spindle 3a provides the drive of a second carriage.

According to the invention the half-nuts 5 are floatingly mounted on a rocker 6 mounted for rotation on an axis A perpendicular to the spindle. According to the invention, this rocker 6 is furthermore loaded by a spring 17 in a direction towards the spindle 3, the half-nut being thereby pressed against the spindle.

To simplify as much as possible the floating suspension of the spindle nut 5, the nut body 5, on its side remote from the screwthread, has a pivot 7 having a convex surface. This pivot is provided in a conical bore 16 of the rocker, or of an arm 8 connected to the rocker.

For transmitting the transverse forces from the spindle 3 to the spindle nut 5 in both directions of movement of the carriage as far as possible without moments, it is preferable to arrange the point of application B between the surface of the pivot 7 and the conical bore 16 approximately on a line P passing through the pivoting axis A of the rocker and parallel to the spindle 3.

For accommodating the rocker-loading spring for saving as much space as possible, and at the same time for permitting adjustment of the spring force from the outside, it is advantageous to allow the spring 17 to act on a bell-crank 12. This bell-crank is mounted by means of a pivot 13 on the free end of the rocker 6 for pivoting in the direction W. One lever arm 12a is supported on a fixed stop 13, connected to the carriage. Acting on the other lever arm 12b in the embodiment example shown is the spring 17, formed in the embodiment example of cup-type springs and supported by the bolt 11, which in turn is again connected to the rocker. This arrangement requires little space, since the spring extends in the longitudinal direction of the spindle where there is sufficient space between carriage and cross-rail. Due to the pressure of the spring 17, an anticlockwise moment is exerted on the bell-crank 12, and hence a downwardly directed force is exerted on the rocker. This force presses the spindle nut against the screwthread of the spindle 3. Owing to the floating suspension, the nut is able to adjust itself freely in all directions, and hence bears quite without backlash or play against the spindle.

To allow the spindle nut to follow all the geometrical irregularities of the spindle screwthread, the rocker 6 must be easily movable. In addition, there should also be provided a backlash-free bearing between the pivot 9, on which the rocker 6 is rotatable, and the rocker itself. This bearing is advantageously in the form of a needle bearing 10.

To enable the spindle nut to be easily mounted or dismounted, the housing by means of which the rocker 6 is mounted on the pivot 9 is advantageously made in two parts, the line of separation then advantageously extending perpendicular to the spindle. The screws 15, which hold together the parts 6 and 6' of the rocker, are thereby rendered readily accessible from the outside and the rocker can easily be removed from the pivot 9.

I claim:

1. In a machine tool having a carriage displaceable by a threaded spindle engaging a half-nut, the combination of a rocker for carrying the half-nut, means floatingly mounting the half-nut on the rocker, means mounting the rocker for rotation about an axis perpendicular to the spindle, and spring means biasing the rocker in the direction of the spindle, whereby the half-nut is pressed against the spindle.

2. In a machine tool as claimed in claim 1, said half-nut having a pivot with a convex surface on the side of the half-nut remote from the thread, said rocker having a conical bore co-operating with said pivot.

3. In a machine tool as claimed in claim 2, the point of engagement of the pivot with the conical bore lying approximately on a line passing through the pivot axis of the rocker and parallel to the spindle.

4. In a machine tool as claimed in claim 1, a bell crank pivotally mounted on a free end of the rocker, said bell crank having a first lever arm and a second lever arm, a fixed stop supporting said first lever arm, said spring means comprising a pressure spring arranged parallel to the spindle and acting on said second lever arm.

5. In a machine tool as claimed in claim 1, said means mounting the rocker comprising a bearing housing made in two parts, the line of separation of said parts extending perpendicular to the spindle.

References Cited
UNITED STATES PATENTS

| | | | |
|---|---|---|---|
| 1,467,039 | 9/1923 | Hume | 74—424.8 |
| 3,235,220 | 2/1966 | Rantsch et al. | 74—424.8 X |

LEONARD H. GERIN, Primary Examiner

U.S. Cl. X.R.

74—424.8, 459